United States Patent [19]

Shigemasa

[11] Patent Number: 4,719,561
[45] Date of Patent: Jan. 12, 1988

[54] ROBUST CONTROL APPARATUS RESPONSIVE AGAINST DISTURBANCE

[75] Inventor: Takashi Shigemasa, Yokohama, Japan

[73] Assignee: Kabushiki Kaisha Toshiba, Kawasaki, Japan

[21] Appl. No.: 752,593

[22] Filed: Jul. 8, 1985

[30] Foreign Application Priority Data

Oct. 3, 1984 [JP] Japan .................. 59-206258

[51] Int. Cl.$^4$ ........................................... G05B 13/02
[52] U.S. Cl. ......................... 364/148; 364/151; 364/160; 364/162; 364/163
[58] Field of Search ............... 364/148, 151, 160, 162, 364/163, 135; 318/561, 610, 615

[56] References Cited

U.S. PATENT DOCUMENTS 4,408,148 10/1985 Herzog .......................... 364/162
4,546,426 10/1985 Häfner et al. .................. 364/149

OTHER PUBLICATIONS

Theory and Applications of Adaptive Control-A Survey-: Automatica, vol. 19, No. 5, pp. 471-486: K. J. Astrom (1983).
A Survey of Model Reference Adaptive Techniques: Theory and Applications, Atuomatica, vol. 10, pp. 353-379; I. D. Landau (1974).
IEEE Transactions on Automatic Control, vol. AC-23, No. 5, Oct. 1978, pp. 930-933, IEEE, N.Y., U.S.; H. G. Kwatny et al.: "On Alternative Methodologies for the Design of Robust Linear Multivariable Regulators".
IEEE Proceedings Sections A a I, vol. 131, No. 3, Part D, May 1984, pp. 103-107, Old Woking, Surrey, GB; C. S. Berger et al.: "Robust Controller Design by Minimisation of the Variation of the Coefficients of the Closed-Loop Characteristic Equation".

Primary Examiner—Jerry Smith
Assistant Examiner—John R. Lastova
Attorney, Agent, or Firm—Oblon, Fisher, Spivak, McClelland, & Maier

[57] ABSTRACT

A process control apparatus comprises a main controller having a first integrator for integrating a difference signal between a set point and an output of a process and a PD (proportional-derivative) arithmetic operating unit for executing the PD arithmetic operation for the output of the process. The main controller obtains a control signal on the basis of an I-PD (integral-poroportional-derivative) control method and supplying this control signal to the process. A robust controller, connected to the output of the process, comprises a high-order differentiator for high-order differentiating the output of the process, a second integrator for integrating the difference signal between the set point and the output of the process, a subtractor for subtracting an output of the second integrator from an output of the high-order differentiator, and an amplifier for amplifying an output of the subtractor and feeding back this amplified output to the control signal.

6 Claims, 8 Drawing Figures

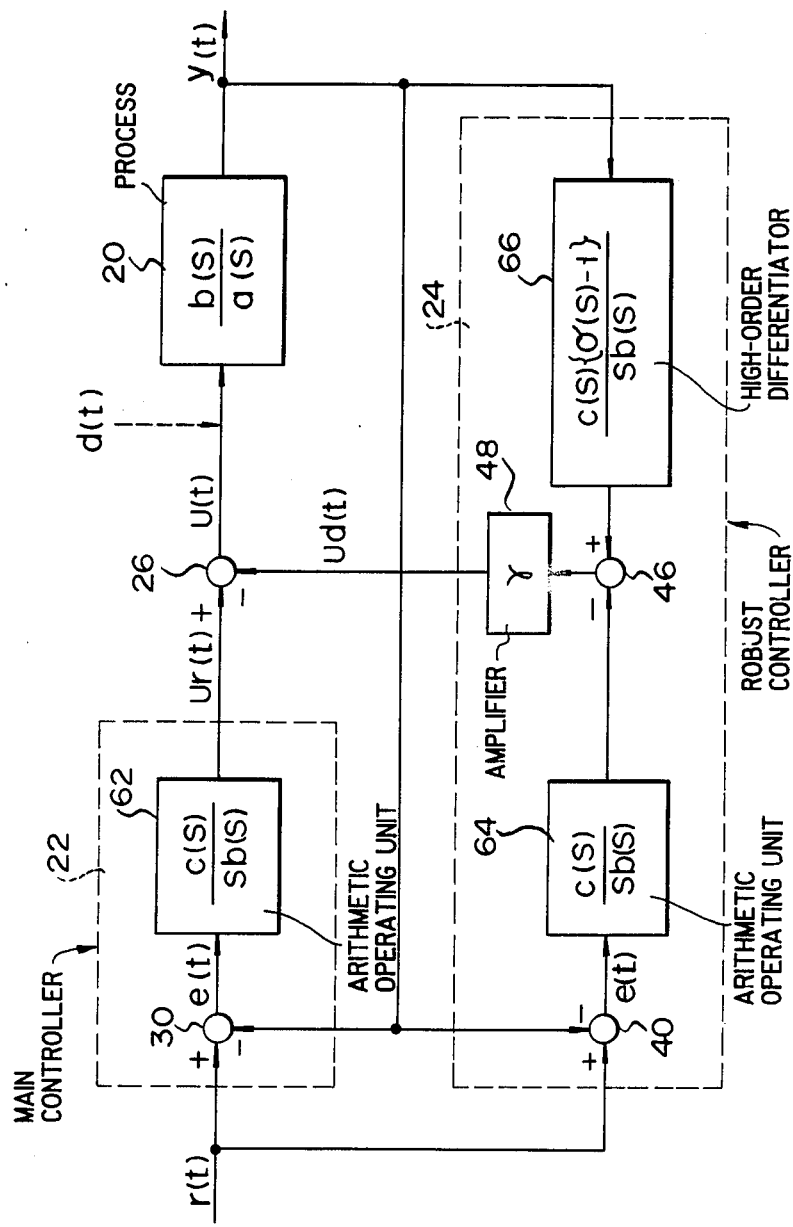
F I G. 6

ROBUST CONTROL APPARATUS RESPONSIVE AGAINST DISTURBANCE

BACKGROUND OF THE INVENTION

The present invention relates to a process control apparatus and, more particularly, to a process control apparatus for controlling a process whose dynamic characteristic changes.

In order to control the temperature, pressure, flow rate or the like of a plant, control parameters of the process control apparatus should be properly set in accordance with the dynamic characteristic of the plant to be controlled. When the control parameters do not correspond to the dynamic characteristic, an oscillation in the process control loop of the plant may occur and part or all of the plant may be destroyed. The operating environment e.g., the dynamic characteristic of the plant during operation changes when moves are made to conserve energy.

There are two types of conventional control apparatuses: one is an apparatus in which control parameters are fixed during the operation of the plant; and the other is an apparatus in which the control parameters are tuned by detecting the dynamic characteristic during the operation. In the former apparatus, the control parameters fall within a safety range in consideration of the worst conditions. However, when the change in the dynamic characteristic is greater than the expected value, the control characteristics are degraded. In order to prevent this, the latter apparatus is proposed to tune the control parameters during the operation. This latter process control apparatus is classified into two types in the following manner.

When a relationship between the cause and effect of a change in the dynamic characteristic (i.e., a relationship between a cause of a change in the dynamic characteristic and the resultant dynamic characteristic) is known, a gain schedule control system is used, as shown in FIG. 1. In this system, an auxiliary signal directly related to a change in a dynamic characteristic is generated from a process 10 and is supplied to a gain scheduler 12. The control parameters are calculated in accordance with a gain schedule curve stored therein. The control parameters are then supplied to a controller 14. The controller 14 controls a control signal u(t) such that a process output signal y(t) becomes equal to a set point signal r(t).

However, when the relationship between the cause and effect is unknown, a model reference adaptive control system shown in FIG. 2 is used. This system has a process 10 and a reference model 16. A set point signal r(t) is supplied to the reference model 16 as well as to a controller 14. An error, i.e., an output error between the outputs from the process 10 and the reference model 16, is calculated by a subtractor 18. An adaptive tuning device 19 determines the control parameters of the controller 14 in such a manner that the output error becomes zero.

These two conventional control systems are summarized as follows. The gain schedule control system can be used only when the relationship between the cause and effect of the change in the dynamic characteristic of the process 10 is known and the auxiliary process signal directly related to the change in the dynamic characteristic can be detected. Therefore, this system cannot be used when the dynamic characteristic of the process 10 is unknown, resulting in inconvenience. On the other hand, the model reference adaptive control system can be used even if the dynamic characteristic of the process 10 is unknown. However, it takes a long time for this system to tune the control parameters of the controller 14 in accordance with the dynamic characteristic of the process 10. In addition, when the process 10 is a non-minimum phase process, it is difficult to control the process 10 based on the reference model 16. When unknown disturbance or measuring noise is present, the adaptive tuning device 19 erroneously detects a change in the dynamic characteristic. As a result, the control parameters of the controller 14 are erroneously changed. This problem has not been solved until now.

These conventional process control systems for tuning the control parameters during the operation of the process are highly sensitive. The sensitivity of the control system is defined as follows. When the dynamic characteristic of the process changes from $G_p(s)$ to $\bar{G}_p(s)$ $(=G_p(s)+\Delta G_p(s))$, and the transfer function $(y(t)/r(t))$ in FIGS. 1 and 2) of the control system as a whole changes from $T(s)$ to $\bar{T}(s)$ $(=T(s)+\Delta T(s))$, the sensitivity $S(s)$ is given by $$S(s)=(\Delta T(s)/\bar{T}(s))/(\Delta G_p(s)/\bar{G}_p(s)) \qquad (1)$$

Equation (1) indicates how a change in the process to be controlled influences the control system. The smaller the sensitivity becomes, the less the degradation of control performance of the control system, with respect to the change $\Delta G_p(s)$ in the process, becomes. On the contrary, a control system of high sensitivity is defined as a system in which the transfer function of the control system as a whole greatly changes in accordance with a change in a dynamic characteristic of the process. A change in a transfer function of the control system degrades the control characteristic of the control system. A control system of low sensitivity is defined as a robust control system in which the transfer function of the control system as a whole does not change, thus preventing degradation of the control performance even if the dynamic characteristic of the process to be controlled changes.

To cope with such circumstances, the present inventor has previously applied a robust process control apparatus using a dynamic model of a process to be controlled (U.S. patent application Ser. No. 690,259, "Process Control Apparatus," filed on Jan. 10, 1985). This former application needs the arithmetic operation of a dynamic model and has problems such that its constitution is complicated and also its operation time is long.

SUMMARY OF THE INVENTION

It is an object of the present invention to realize a low sensitive (robust) process control apparatus by a simple constitution in which even if the dynamic characteristic of a subject to be controlled changes, the transfer function of the whole control system is hardly changed and the control performance is hardly degraded.

This object is realized by a process control apparatus comprising main controller means, connected to an input of the process to be controlled, for obtaining a control signal of the process in accordance with a set point and an output of the process and supplying this control signal to the process and robust controller means, connected to the output of the process, for high-order differentiating the output of the process and then feeding back the result of this differentiation to the control signal.

BRIEF DESCRIPTION OF THE DRAWINGS

FIG. 6 is a block diagram of the fourth embodiment of the process control apparatus according to the invention;

DETAILED DESCRIPTION OF THE PREFERRED EMBODIMENTS

Figure 1:
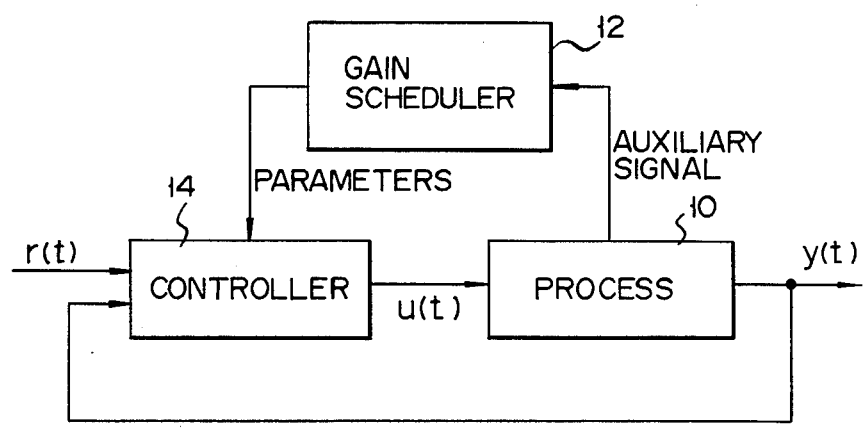
FIG. 1 is a block diagram of a conventional process control apparatus of a gain schedule system.
Figure 2:
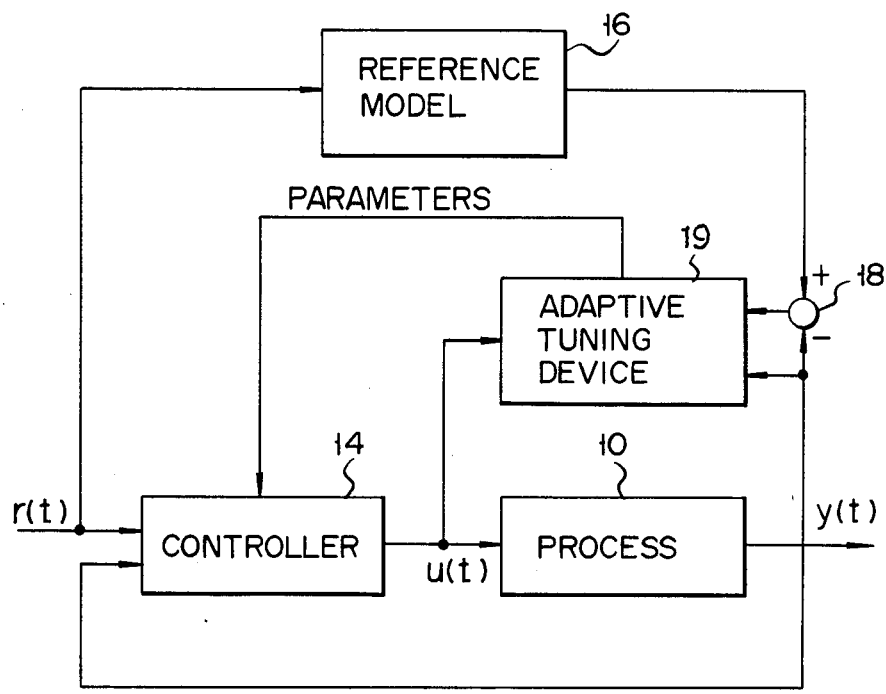
FIG. 2 is a block diagram of a conventional process control apparatus of a model reference adaptive control system.
Figure 3:
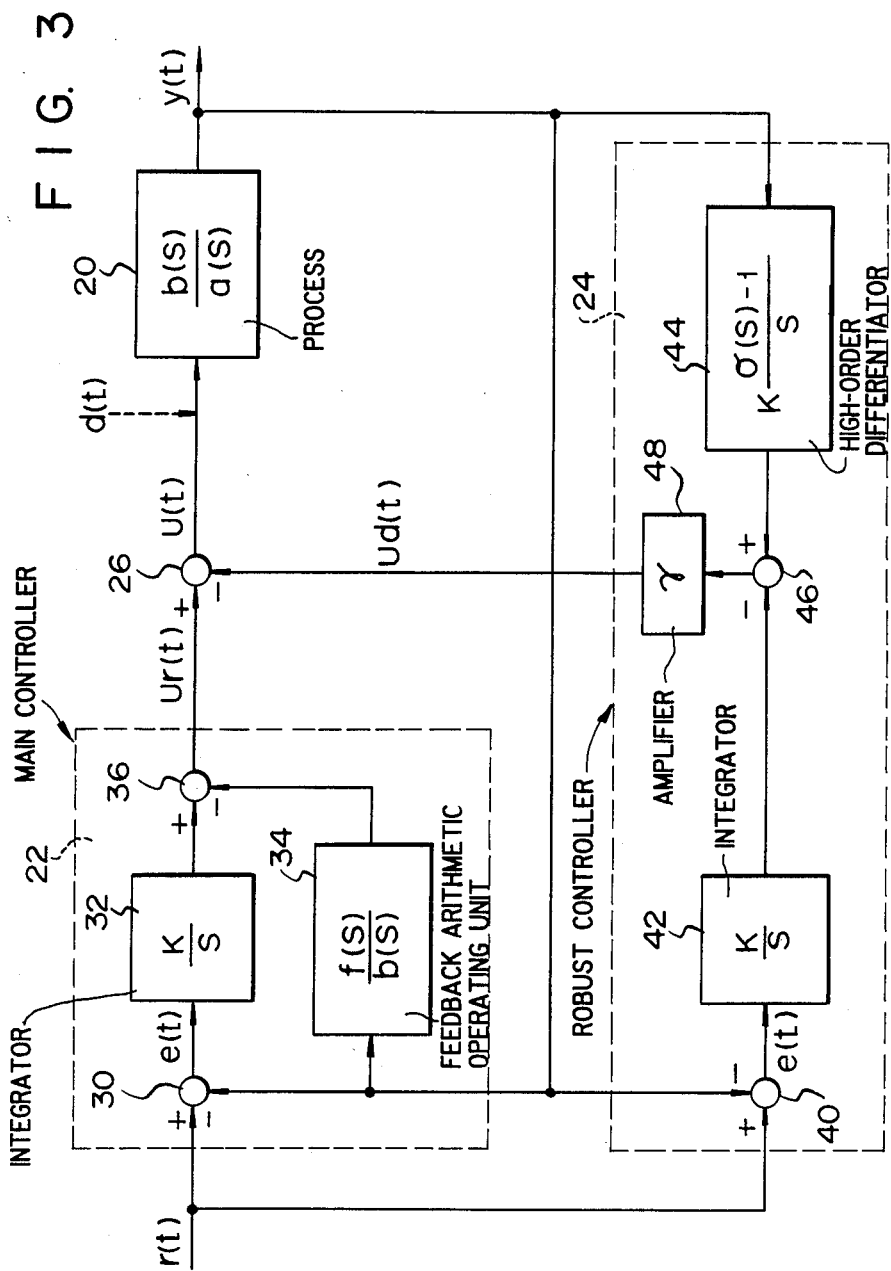
FIG. 3 is a block diagram of the first embodiment of a process control apparatus according to the present invention.

One embodiment of a process control apparatus according to the present invention will now be described hereinbelow with reference to the drawings. FIG. 3 is a block diagram of the first embodiment. This embodiment comprises a process 20, a main controller 22, a robust controller (low sensitivity controller) 24, and a substractor 26 to subtract an output signal of the robust controller 24 from an output control signal of the main controller 22. An output signal y(t) of the process 20 and its set point signal r(t) are supplied to the main controller 22 and to the robust controller 24. The main controller 22 controls the process 20 on the basis of an I-PD (integral-proportional-derivative) control theory and comprises a subtractor 30 for substracting the process output signal y(t) from the set point signal r(t) and obtaining a deviation signal e(t), an integrator 32 for integrating the deviation signal e(t), a feedback arithmetic operating unit 34 for PD (proportional-derivative) arithmetic operating the process output signal y(t), and a subtractor 36 for subtracting an output of the feedback arithmetic operating unit 34 from an output of the integrator 32 and obtaining a control signal Ur(t). The robust controller 24 comprises a subtractor 40 for subtracting the process output signal y(t) from the set point signal r(t) and obtaining the deviation signal e(t), an integrator 42 for integrating the deviation signal e(t), a high-order differentiator 44 for high-order differentiating the process output signal y(t), a subtractor 46 for subtracting an output of the integrator 42 from an output of the high-order differentiator 44, and an amplifier 48 for increasing an output of the subtractor 46 by γ times and obtaining a feedback control signal Ud(t). The subtractor 26 subtracts the feedback control signal Ud(t) which is output from the robust controller 24 from the output control signal Ur(t) of the main controller 22 to obtain a control signal U(t) and then supplies this control signal U(t) to the process 20. In partical situations, a disturbance d(t) may be also applied to the process 20.

The operation of this embodiment will now be explained. Control constants of the integrator 32 and feedback arithmetic operating (PD arithmetic operating) unit 34 in the main controller 22 are set such that the transfer function from the set point r(t) to the output signal y(t) becomes a desired value under the ordinary operating condition of the process 20. Therefore, the deviation signal e(t) is "0" under the ordinary operating condition. When the disturbance d(t) is applied or the dynamic characteristic of the process 20 changes, the deviation signal e(t) which is not "0" is generated and the process 20 is controlled in the following manner by means of the main controller 22 and robust controller 24. It is now assumed that the transfer functions of the process 20, integrator 32, feedback arithmetic operating unit 34, integrator 42, high-order differentiator 44, and amplifier 48 are $\underline{b}(s)/\underline{a}(s)$, $K/s$, $\underline{f}(s)/\underline{b}(s)$, $K/s$, $K\{\underline{\sigma}(s)-1\}/s$, and γ, respectively. In these functions, $\underline{a}(s)$, $\underline{b}(s)$ and $\underline{f}(s)$ are polynomials of a differential operator s. $\underline{\sigma}(s)$ is a polynomial function of the differential operator s and given by:

$$\underline{\sigma}(s) = 1 + \sigma s + a_2(\sigma s)^2 + a_3(\sigma s)^3 \tag{2}$$

Thus, the transfer function $K\{\underline{\sigma}(s)-1\}/s$ of the high-order differentiator 44 becomes:

$$K\{\underline{\sigma}(s)-1\}/s = K[\sigma + a_2\sigma^2 s + a_3\sigma^3 s^2 + a_4\sigma^4 s^3 + \ldots] \tag{3}$$

When attention is paid to the input terminal of the process 20, the following relation is derived.

$$K\{r(t) - y(t)\}/s - \{\underline{f}(s)/\underline{b}(s)\}y(t) + \gamma K\{r(t) - y(t)\}/s - \gamma K\{\underline{\sigma}(s) - 1\}y(t)/s + d(t) = \{\underline{a}(s)/\underline{b}(s)\}y(t) \tag{4}$$

By modifying this relation, we have $$(1+\gamma)r(t) + (s/K)d(t) = [1 + s\{\underline{a}(s) + \underline{f}(s)\}/K\underline{b}(s) + \gamma\underline{\sigma}(s)]y(t) \tag{5}$$

Therefore, the output signal y(t) of the process 20 is expressed as follows.

$$y(t) = \{(1+\gamma)r(t) + sd(t)/K\}/[1 + s\{\underline{a}(s) + \underline{f}(s)\}/K\underline{b}(s) + \gamma\underline{\sigma}(s)] \tag{6}$$

When $1 + s(a(s) + f(s))/Kb(s)$ is made coincident with $\underline{\sigma}(s)$ by adjusting K and $\underline{f}(s)$ and an amplification factor γ of the amplifier 48 is set to a positive value, the output signal y(t) of the process 20 is expressed as follows.

$$y(t) = \{1/\underline{\sigma}(s)\}r(t) \tag{7}$$

It will be understood from equation (6) that the transfer function from the set point r(t) to the output signal y(t) is constant irrespective of the change in the dynamic characteristic of the process 20 to be controlled and that the control performance is not degraded. Therefore, the sensitivity of the whole control system becomes low by means of the robust controller 24.

On one hand, the transfer function y(t)/d(t) from the disturbance d(t) to the output signal y(t) becomes $$y(t)/d(t) = s/K(1+\gamma)\underline{\sigma}(s) \tag{8}$$

Therefore, it will also be appreciated that the regulation property to the disturbance in this control system is also improved.

In this case, the amplification factor $\gamma$ of the amplifier 48 relates to the robust property to prevent deterioration of the control performance to the change in the dynamic characteristic of the process 20 to be controlled; therefore, it is called a robust gain. As described above, it is desirable that the robust gain $\gamma$ is a positive value; however, if it is too large, the control system becomes unstable and the oscillation could be caused. Therefore, it may be set to a small positive value, for example, between five and ten.

Figure 4:
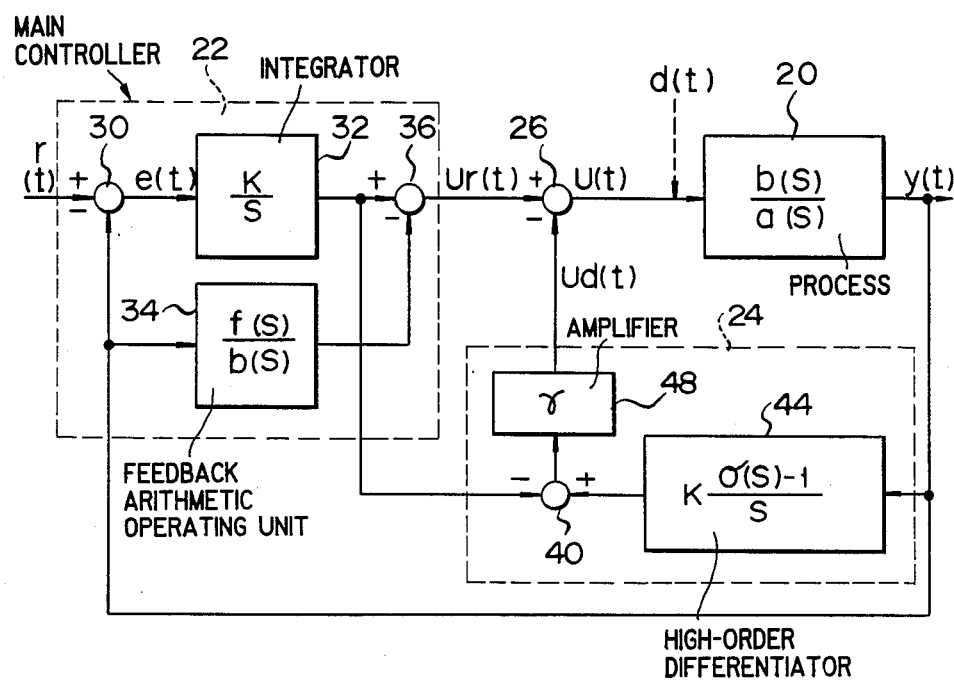
FIG. 4 is a block diagram of the second embodiment of the process control apparatus according to the invention.

Other embodiments of the invention will now be described hereinbelow. In the following embodiments, the similar parts and components as those shown in the first embodiment are designated by the same reference numerals and their detailed descriptions are omitted. FIG. 4 is a block diagram of the second embodiment of the invention. This second embodiment is a modified form of the first embodiment. In FIG. 3, an output of the integrator 42 in the robust controller 24 is the same as the output of the integrator 32 in the main controller 22. Therefore, by constituting the apparatus as shown in FIG. 4, the subtractor 40 and integrator 42 in the robust controller 24 can be omitted. In the second embodiment, the output signal of the integrator 32 in the main controller 22 is supplied to a negative (−) input terminal of the subtractor 46 in the robust controller 24. The output of the high-order differentiator 44 is supplied to a positive (+) input terminal of the subtractor 46 similarly to the first embodiment.

Figure 5:
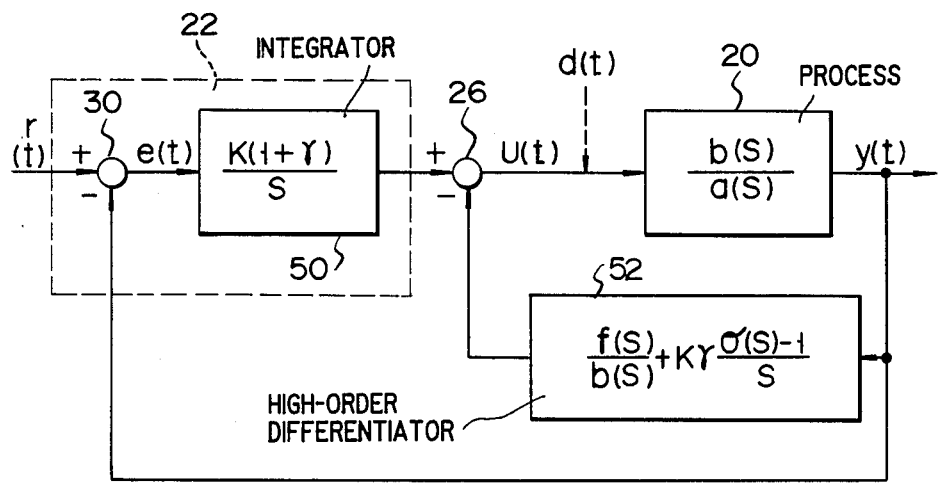
FIG. 5 is a block diagram of the third embodiment of the process control apparatus according to the invention.

FIG. 5 is a block diagram of the third embodiment of the invention. This third embodiment relates to an equivalently transformed apparatus of FIG. 4. The main controller 22 comprises the subtractor 30 for subtracting the output signal y(t) from the set point signal r(t) and obtaining the deviation signal e(t), and an integrator 50 for executing the integration of $K(1+\gamma)/s$ for the deviation signal e(t). The robust controller comprises a high-order differentiator 52 for executing the high-order differentiation and PD arithmetic operation of $\underline{f}(s)/\underline{b}(s)+K\gamma\{\underline{\alpha}(s)-1\}/s$ for the output signal y(t).

In this third embodiment as well, when attention is paid to the input terminal of the process 20, the following relation is derived.

$$K(1+\gamma)\{r(t) - y(t)\}/s - [\underline{f}(s)/\underline{b}(s) + \gamma K\{\underline{\alpha}(s) - \quad (9)$$

$$1\}/s]y(t) + d(t) = \{\underline{a}(s)/\underline{b}(s)\}y(t)$$

By modifying this equation, the transfer function from the set point signal r(t) to the output signal y(t) of the process 20 becomes the above-mentioned equation (7) and the transfer function from the disturbance d(t) to the output signal y(t) becomes the foregoing equation (8), so that the same result as the first embodiment is derived.

The above-described embodiments relate to the embodiments using the controller based on the I-PD control method as the main controller 22. Other embodiments in the case of using a controller based on the PID (proportional-integral-derivative) control method will now be explained.

FIG. 6 is a block diagram of the fourth embodiment. The main controller 22 in the fourth embodiment controls the process 20 on the basis of the PID control method and comprises the subtractor 30 for subtracting the process output signal y(t) from the set point value r(t) and obtaining the deviation signal e(t), and a PID arithmetic operating unit 62 for executing the PID arithmetic operation of $\underline{c}(s)/s\underline{b}(s)$ for the deviation signal e(t). The robust controller 24 comprises a subtractor 40 for subtracting the process output signal y(t) from the set point signal r(t) and obtaining the deviation signal e(t), a PID arithmetic operating unit 64 for executing the PID arithmetic operation of $\underline{c}(s)/s\underline{b}(s)$ for the deviation signal e(t), a high-order differentiator 66 for calculating the high-order differentiation of $\underline{c}(s)\{\underline{\sigma}(s)-1\}/s\underline{b}(s)$ for the process output signal y(t), a subtractor 46 for subtracting an output of the PID arithmetic operating unit 64 from an output of the high-order differentiator 66, and an amplifier 48 for increasing the output of the subtractor 46 by $\gamma$ times and obtaining the feedback control signal Ud(t) and for supplying this signal to the subtractor 26 and thereby feeding back to the control signal U(t).

The operation of the fourth embodiment will now be explained. A control constant of the PID arithmetic operating unit 62 in the main controller 22 is set such that the transfer function from the set point r(t) to the output signal y(t) becomes a desired value under the ordinary operating condition of the process 20. Therefore, the deviation signal e(t) is "0" under the ordinary operating conditions. When the disturbance d(t) is applied or the dynamic characteristic of the process 20 changes, the deviation signal e(t) which is not "0" is generated and the process 20 is controlled by the main controller 22 and robust controller 24 in the following manner. It is now assumed that the transfer functions of the process 20, PID arithmetic operating unit 62 and 64, high-order differentiator 66, and amplifier 48 are respectively $\underline{b}(s)/\underline{a}(s)$, $\underline{c}(s)/s\underline{b}(s)$, $\underline{c}(s)/s\underline{b}(s)$, $\underline{c}(s)\{\underline{\sigma}(s)-1\}/s\underline{b}(s)$, and $\gamma$. $\underline{a}(s)$, $\underline{b}(s)$, $\underline{f}(s)$, and $\underline{\sigma}(s)$ are similar to those in the case of the first embodiment. When attention is paid to the input terminal of the process 20, the following relation is derived.

$$\underline{c}(s)\{r(t) - y(t)\}/s\underline{b}(s) + \gamma\underline{c}(s)\{r(t) - y(t)\}/s\underline{b}(s) - \quad (10)$$

$$\gamma\underline{c}(s)\{\underline{\sigma}(s) - 1\}y(t)/s\underline{b}(s) + d(t) = \{\underline{a}(s)/\underline{b}(s)\}y(t)$$

By modifying this equation, we have $$R(t)+\{s\underline{b}(s)/\underline{c}(s)\}d(t)=\{1+s\underline{a}(s)/\underline{c}(s)+\gamma\underline{\sigma}(s)\}y(t) \quad (11)$$

Thus, the output signal y(t) of the process 20 is expressed as follows.

$$y(t)=[r(t)+\{s\underline{b}(s)/\underline{c}(s)\}d(t)]/\{1+s\underline{a}(s)/\underline{c}(s)+\gamma\underline{\sigma}(s)\} \quad (12)$$

When $1+sa(s)/c(s)$ is made coincident with $\underline{\sigma}(s)$ by adjusting the $\underline{a}(s)$ and $\underline{c}(s)$ and the amplification factor, i.e., robust gain $\gamma$ of the amplifier 48 is set to a large positive value, the output signal y(t) of the process 20 is expressed, similarly to the first embodiment, as follows.

$$y(t)=\{1/\underline{\sigma}(s)\}r(t) \quad (13)$$

It will be understood from this equation that the transfer function from the set point r(t) to the output signal y(t) is constant irrespective of the change in the dynamic characteristic of the process 20 to be controlled and that the control performance is not degraded.

On the other hand, the transfer function y(t)/d(t) from the disturbance d(t) to the output signal y(t) becomes $$y(t)/d(t) = s\underline{b}(s)/(1+\gamma)\underline{c}(s)\underline{a}(s) \qquad (14)$$

similarly to the first embodiment. Consequently, it will be understood that the regulation property to the disturbance in this control system is improved as well.

Figure 7:
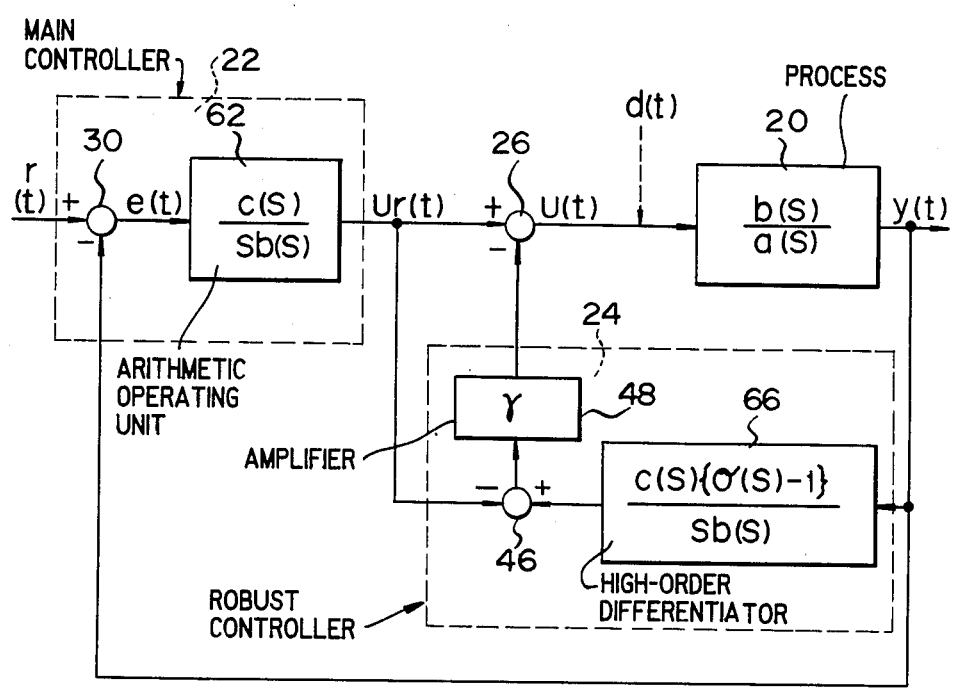
FIG. 7 is a block diagram of the fifth embodiment of the process control apparatus according to the invention.

FIG. 7 is a block diagram of the fifth embodiment of the invention showing a modified form of the fourth embodiment. Since the output of the PID arithmetic operating unit 64 in the robust controller 24 in FIG. 6 is the same as the output of the PID arithmetic operating unit 62 in the main controller 22, by constituting the apparatus as shown in FIG. 7, the subtractor 40 and PID arithmetic operating unit 64 can be omitted. Namely, the output signal of the PID arithmetic operating unit 62 in the main controller 22 is supplied to the negative (−) input terminal of the subtractor 46 in the robust controller 24. The output of the high-order differentiator 66 is supplied to the positive (+) input terminal of the subtractor 46 similarly to the fourth embodiment.

Figure 8:
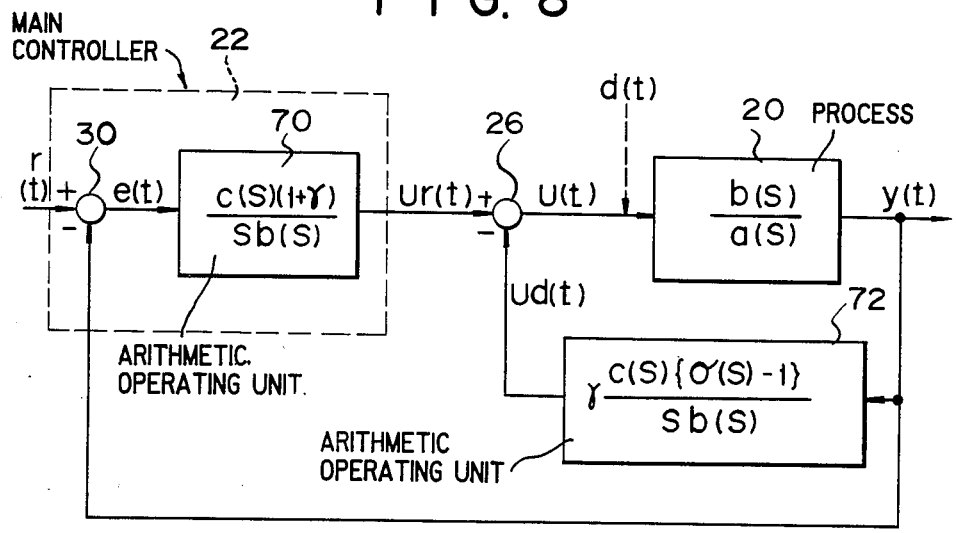
FIG. 8 is a block diagram of the sixth embodiment of the process control apparatus according to the invention.

FIG. 8 is a block diagram of the sixth embodiment of the invention showing an equivalently transformed apparatus of FIG. 7. The main controller 22 comprises a subtractor 30 for subtracting the output signal y(t) from the set point signal r(t) and obtaining the deviation signal e(t), and a PID arithmetic operating unit 70 for executing the PID arithmetic operation of $\underline{c}(s)(1+\gamma)/s\underline{b}(s)$ for the deviation signal e(t). The robust controller comprises a PID arithmetic operating unit 72 for executing the PID arithmetic operation of $\gamma\underline{c}(s)\{\underline{a}(s)-1\}/s\underline{b}(s)$ for the output signal y(t).

In this sixth embodiment as well, when attention is paid to the input terminal of the process 20, the following relation is obtained.

$$\{\underline{c}(s)(1 + \gamma)/s\underline{b}(s)\}\{r(t) - y(t)\} - [\gamma\underline{c}(s)\{\underline{a}(s) - \\ 1\}/s\underline{b}(s)]y(t) + d(t) = \{\underline{a}(s)/\underline{b}(s)\}y(t) \qquad (15)$$

By modifying this equation, the transfer function from the set point signal r(t) to the output signal y(t) of the process 20 becomes the foregoing equation (13) and the transfer function from the disturbance d(t) to the output signal y(t) becomes the above-mentioned equation (14), so that the same result as the fourth embodiment is derived.

As described above, according to the present invention, in the process control apparatus comprising a main controller, connected to an input of a process to be controlled, for obtaining a control signal to the process in accordance with a set point and an output of the process, a robust controller for making a sensitivity low (which includes a high-order differentiator and feeds back an output of the process to the control signal) is connected to the output of the process. As a result, a robust process control apparatus is provided in which the transfer function of the whole control system is hardly changed and the control performance is hardly degraded even if the dynamic characteristic of the process changes.

What is claimed is:

1. A process control apparatus comprising:
   main controller means, connected to an input of a process to be controlled, for obtaining a control signal of the process in accordance with a set point and an output of the process and supplying said control signal to the process; and
   robust controller means, connected to the output of the process, for high-order differentiating the output of the process and then feeding back the result of said differentiation to said control signal;
   wherein said robust controller means comprises a high-order differentiator for high-order differentiating the output of said process, an arithmetic operating unit for executing an arithmetic operation for a difference signal between the set point and the output of the process, a subtractor for subtracting an output of said arithmetic operating unit from an output of said high-order differentiator, and an amplifier for amplifying an output of said subtractor and feeding back said amplified output to said control signal.

2. A process control apparatus according to claim 1, wherein said main controller means has a first integrator for integrating the difference signal between the set point and the output of the process and obtains the control signal on the basis of an I-PD (integral-proportional-derivative) control method, and said arithmetic operating unit in said robust controller means is a second integrator.

3. A process control apparatus according to claim 2, wherein said main controller means further comprises a PD (proportional-derivative) arithmetic operating unit for executing a PD arithmetic operation for the output of the process and a subtractor for subtracting an output of said PD arithmetic operating for the output of the process and a subtractor for subtracting an output of said PD arithmetic operating unit from an output of said integrator and obtains the control signal on the basis of the I-PD control theory, and said robust controller means further comprises a high-order differentiator for high-order differentiating the output of the process, a subtractor for subtracting the output of the second integrator from the output of said high-order differentiator, and an amplifier for amplifying the output of said subtractor and feeding back said amplified output to said control signal.

4. A process control apparatus according to claim 1, wherein said main controller means comprises a PID (proportional-integral-derivative) arithmetic operating unit for executing a PID arithmetic operation for the difference signal between the set point and the output of the process and obtains the control signal on the basis of a PID control method, and said arithmetic operating unit in said robust controller means is a PID arithmetic operating unit.

5. A process control apparatus according to claim 1, wherein said main controller means comprises a PID (proportional-integral-derivative) arithmetic operation unit for executing a PID arithmetic operation for the difference signal between the set point and the output of the process and obtains the control signal on the basis of a PID control theory, and said robust controller means comprises the high-order differentiator for high-order differentiating the output of the process, the subtractor for subtracting an output of said PID arithmetic operating unit from an output of said high-order differentiator, and the amplifier for amplifying the output of said subtractor and feeding back said amplified output to said control signal.

6. A process control apparatus comprising:

main controller means, connected to an input of a process to be controlled, for obtaining a control signal of the process in accordance with a set point and an output of the process and supplying said control signal to the process; and robust controller means, connected to the output of the process, for high-order differentiating the output of the process and then feeding back the result of said differentiation to said control signal;

wherein said main controller means has an integrator for integrating the difference signal between the set point and the output of the process and obtains the control signal on the basis of an I-PD (integral-proportional-derivative) control theory, and said robust controller means comprises an arithmetic operating unit for executing the high-order differentiation and a PD (proportional-derivative) arithmetic operation for the output of the process.

* * * * *